United States Patent
Rhew et al.

(10) Patent No.: US 12,479,345 B2
(45) Date of Patent: Nov. 25, 2025

(54) VEHICLE SEAT COMPONENT HAVING A STORAGE ZONE AND ELECTRONIC DEVICE SUPPORT

(71) Applicant: GM Global Technology Operations LLC, Detroit, MI (US)

(72) Inventors: Choonghee Rhew, Incheon (KR); Taeho Cheong, Incheon (KR); Wonkoo Cho, Incheon (KR)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 384 days.

(21) Appl. No.: 18/178,042

(22) Filed: Mar. 3, 2023

(65) Prior Publication Data

US 2024/0294103 A1    Sep. 5, 2024

(51) Int. Cl.
*B60R 11/02*    (2006.01)
*B60N 2/64*    (2006.01)
*B60N 2/879*    (2018.01)
*B60N 2/90*    (2018.01)
(Continued)

(52) U.S. Cl.
CPC .......... *B60N 2/90* (2018.02); *B60N 2/64* (2013.01); *B60N 2/879* (2018.02); *B60R 16/03* (2013.01); *B60R 2011/0015* (2013.01); *B60R 2011/0017* (2013.01); *B60R 11/02* (2013.01)

(58) Field of Classification Search
CPC ..... B60R 2011/0012; B60R 2011/0014; B60R 2011/0015; B60R 2011/0017; B60R 11/02; B60R 16/03; B60N 2/879; B60N 2/64; B60N 2/90
See application file for complete search history.

(56) References Cited

U.S. PATENT DOCUMENTS

2006/0047426 A1*  3/2006  Vitito .................. B60K 35/00
                                                                 701/469
2007/0222248 A1    9/2007  Maulden et al.
(Continued)

FOREIGN PATENT DOCUMENTS

CN    107487273 A    12/2017
DE    3933946 A1    4/1991
(Continued)

OTHER PUBLICATIONS

"Arkon Mounts—TAB3-RSHM—iPad and iPad Pro or Android Tablet Headrest Mount". Youtube. Accessed Jan. 18, 2023 from the World Wide Web: https://www.youtube.com/watch?v=Vck1uAqZv30.
(Continued)

*Primary Examiner* — Gregory A Blankenship
(74) *Attorney, Agent, or Firm* — CANTOR COLBURN LLP

(57) ABSTRACT

A seat component of for a vehicle seat, in accordance with a non-limiting example, includes a body having a first surface, a second surface opposite the first surface, a first side surface, a second side surface, a top surface, and a bottom surface, and an internal storage volume extending from the second surface toward the first surface within the body. A cover is pivotably mounted to the body at the internal storage volume. The cover includes a first surface portion and a second surface portion. The second surface portion includes an electronic device support.

20 Claims, 8 Drawing Sheets

(51) Int. Cl.
  *B60R 16/03*    (2006.01)
  *B60R 11/00*    (2006.01)

(56) References Cited

U.S. PATENT DOCUMENTS

| | | | |
|---|---|---|---|
| 2009/0225238 A1* | 9/2009 | Vitito | B60R 11/0235 348/837 |
| 2012/0120626 A1* | 5/2012 | Akaike | B60R 11/02 361/807 |
| 2013/0119727 A1* | 5/2013 | Lavelle | H04N 21/4622 297/217.3 |
| 2014/0084648 A1* | 3/2014 | Wen | B60N 2/64 361/679.01 |
| 2016/0114736 A1* | 4/2016 | Tranchina | H04B 1/082 348/837 |
| 2017/0144612 A1* | 5/2017 | Vinton | B60N 2/42 |
| 2017/0154006 A1* | 6/2017 | Tuccinardi | H04R 5/04 |
| 2018/0065513 A1* | 3/2018 | Line | B60N 3/004 |
| 2018/0257575 A1* | 9/2018 | Sanchez | B60R 7/10 |
| 2018/0290573 A1* | 10/2018 | Faruque | B60N 2/879 |
| 2019/0210500 A1* | 7/2019 | Brown | B60R 16/02 |
| 2019/0283881 A1* | 9/2019 | Colletti | B64D 11/0638 |
| 2020/0017034 A1* | 1/2020 | Litterello | B60R 11/02 |
| 2021/0000260 A1* | 1/2021 | Cotterell | B64D 11/0647 |
| 2021/0001760 A1* | 1/2021 | Cotterell | B60N 2/879 |
| 2022/0094183 A1* | 3/2022 | Huffman | H02J 7/0044 |
| 2022/0281387 A1* | 9/2022 | Meisier | B60R 7/043 |
| 2023/0021943 A1* | 1/2023 | Ketels | B60R 11/02 |
| 2024/0294103 A1* | 9/2024 | Rhew | B60N 2/879 |
| 2024/0409039 A1* | 12/2024 | Shipley | B60N 2/879 |
| 2025/0033568 A1* | 1/2025 | Hong | B60N 2/90 |
| 2025/0053038 A1* | 2/2025 | Li | B64D 11/00151 |
| 2025/0074316 A1* | 3/2025 | Odrion | B60N 2/643 |

FOREIGN PATENT DOCUMENTS

| | | |
|---|---|---|
| DE | 102017102072 A1 | 8/2018 |
| KR | 100704103 B1 | 4/2007 |
| KR | 101618572 B1 | 5/2016 |
| KR | 20210146527 A | 12/2021 |

OTHER PUBLICATIONS

"Discovery Click and Go VPLRS0388". Youtube. Accessed Jan. 18, 2023 from the World Wide Web: https://www.youtube.com/watch?v=dM1nSm5iH1M.

"Range Rover Gear—Accessories Lifestyle Film". Youtube. Accessed Jan. 18, 2023 from the World Wide Web: https://www.youtube.com/watch?v=x5y7pVCI3j8.

"Why take a premium bus?" Youtube. Accessed Jan. 18, 2023 from the World Wide Web: https://www.youtube.com/watch?v=_kl9WnxOyXk.

Newway. "Newway Car Tablet Holder Car Headrest Mount 360 Degree Rotation Universal Car Mount." Walmart.com. https://www.walmart.com/ip/Newway-Car-Tablet-Holder-Headrest-Mount-360-Degree-Rotation-Universal-4-7-12-3-Compatible-iPad-Pro-Mini-Air-Samsung-Tab-Huawei-Cellphones-Tablets/101542935?wmlspartner=wlpa&selectedSellerId=18988 (retrieved Jan. 19, 2023). 2 pages.

German Office Action for German Application No. 102023126851.1; dated Apr. 17, 2025; 4 pages.

* cited by examiner

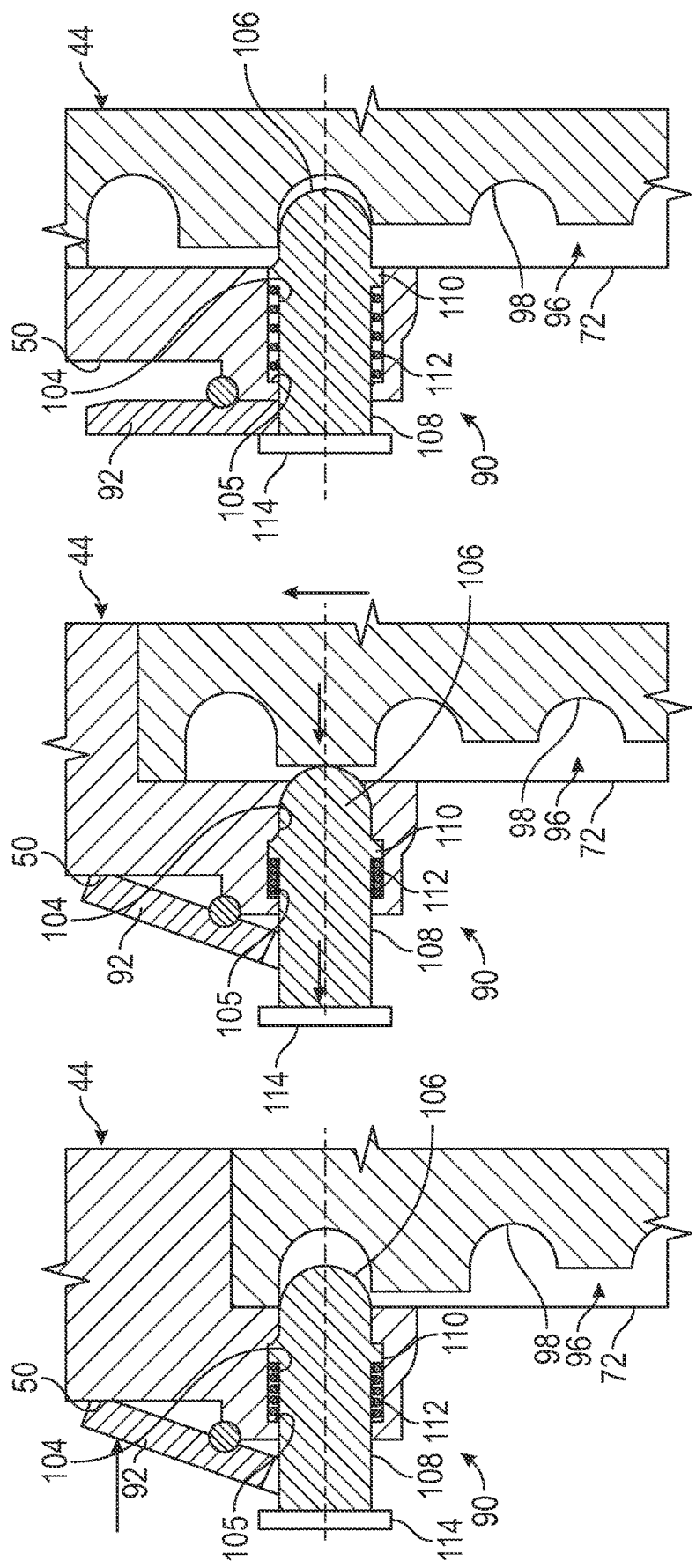

VEHICLE SEAT COMPONENT HAVING A STORAGE ZONE AND ELECTRONIC DEVICE SUPPORT

INTRODUCTION

The subject disclosure relates to the art of vehicle seat components and, more particularly, to a vehicle seat component including a storage zone and electronic device support.

The use of electronic devices that accommodate various consumer needs is ubiquitous. Electronic devices can be used to read books, watch movies, correspond with others using text based applications and video based applications. Often times, electronic devices are used by automobile passengers. Some passengers may decide to read, watch a movie, scan email, play games or take part in any number of distractions during a journey. Other passengers may take time during a journey to conduct a video conference for work, to speak with family members, or to simply pass the time with friends.

Holding and viewing an electronic device for longer periods may create neck strain, back strain, arm strain and the like that will, over time, lead to levels of discomfort. Similarly, holding an electronic device for video conferencing may place an uncomfortable strain on the body. Accordingly, it is desirable to provide a system for hands free interaction with an electronic device in a rear passenger area of a vehicle.

SUMMARY

A seat component of for a vehicle seat, in accordance with a non-limiting example, includes a body having a first surface, a second surface opposite the first surface, a first side surface, a second side surface, a top surface, and a bottom surface, and an internal storage volume extending from the second surface toward the first surface within the body. A cover is pivotably mounted to the body at the internal storage volume. The cover includes a first surface portion and a second surface portion. The second surface portion includes an electronic device support.

In addition to one or more of the features described herein the body includes a selectively retractable hinge mounted to one of the first side surface and the second side surface, the selectively retractable hinge being engageable with the cover.

In addition to one or more of the features described herein the first side surface and the second side surface of the cover includes a first edge and a second edge, the selectively retractable hinge engaging one of the first edge and the second edge to support the cover.

In addition to one or more of the features described herein the one of the first edge and the second edge includes a hinge receiving recess, the hinge receiving recess being selectively engageable by the selectively retractable hinge to form a sliding interface between the cover and the body.

In addition to one or more of the features described herein the one of the first edge and the second edge includes a groove, the hinge receiving recess extending into the cover from the groove.

In addition to one or more of the features described herein the hinge receiving recess includes a generally circular profile partially surrounded by a plurality of grooves.

In addition to one or more of the features described herein the selectively retractable hinge includes a detent element arranged to engage with one of the plurality of grooves to establish an angular position of the cover relative to the seat component.

In addition to one or more of the features described herein one of the first surface portion and the second surface portion includes an electronic device charger.

In addition to one or more of the features described herein the body defines a headrest.

In addition to one or more of the features described herein the body defines a seatback.

A vehicle, in accordance with a non-limiting example, includes a vehicle body including a passenger compartment, a seat mounted in the passenger compartment, a seat component defining a portion of the seat. The seat component includes a body having a first surface, a second surface opposite the first surface, a first side surface, a second side surface, a top surface, and a bottom surface, and an internal storage volume extending from the second surface toward the first surface within the body. A cover is pivotably mounted to the body at the internal storage volume. The cover includes a first surface portion and a second surface portion, the second surface portion including an electronic device support.

In addition to one or more of the features described herein the body includes a selectively retractable hinge mounted to one of the first side surface and the second side surface, the selectively retractable hinge being engageable with the cover.

In addition to one or more of the features described herein the first side surface and the second side surface of the cover includes a first edge and a second edge, the selectively retractable hinge engaging one of the first edge and the second edge to support the cover.

In addition to one or more of the features described herein the one of the first edge and the second edge includes a hinge receiving recess, the hinge receiving recess being selectively engageable by the selectively retractable hinge to form a sliding interface between the cover and the body.

In addition to one or more of the features described herein the one of the first edge and the second edge includes a groove, the hinge receiving recess extending into the cover from the groove.

In addition to one or more of the features described herein the hinge receiving recess includes a generally circular profile partially surrounded by a plurality of grooves.

In addition to one or more of the features described herein the selectively retractable hinge includes a detent element arranged to engage with one of the plurality of grooves to establish an angular position of the cover relative to the seat component.

In addition to one or more of the features described herein one of the first side surface and the second side surface includes an electronic device charger.

In addition to one or more of the features described herein the body defines a headrest.

In addition to one or more of the features described herein the body defines a seatback.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 6C is a plan view of the selectively retractable hinge disengaging from the cover of FIG. 6B, in accordance with a non-limiting example;

FIG. 6D is a plan view of the selectively retractable hinge disengaged allowing the cover to translate relative to the vehicle headrest, in accordance with a non-limiting example;

FIG. 6E is a plan view of the selectively retractable hinge re-engaging with the cover, in accordance with a non-limiting example;

DETAILED DESCRIPTION

Figure 1:
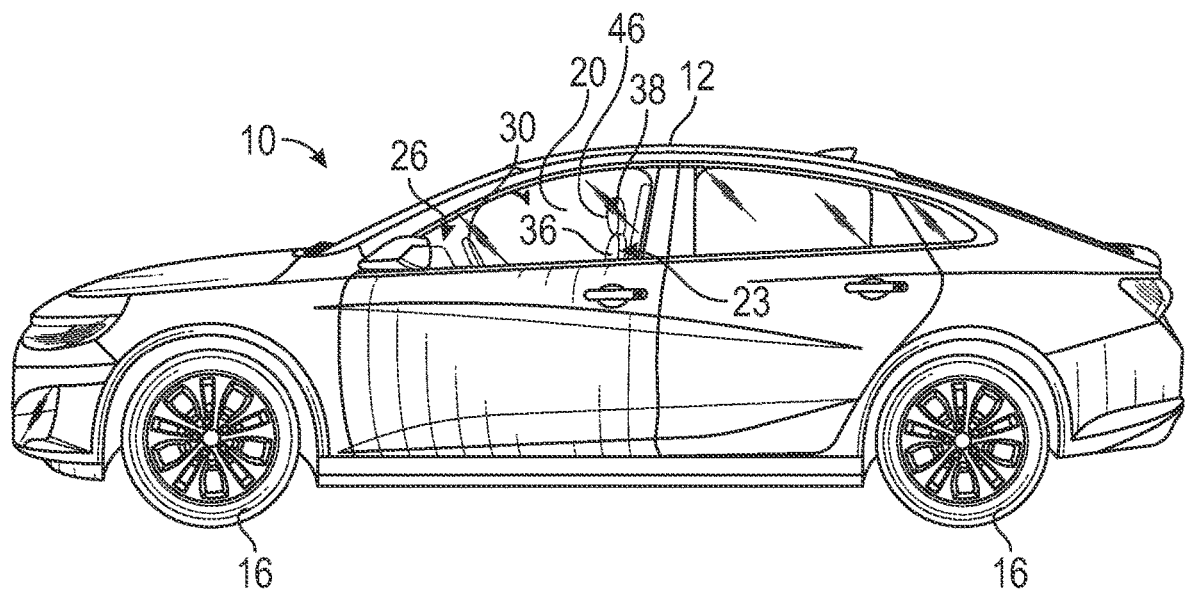
FIG. 1 is a left side view of a vehicle including a seat having a component including a storage zone and cover, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 supported on a plurality of wheels 16. At least two of the plurality of wheels 16 are steerable. Body 12 defines, in part, a passenger compartment 20 having seats, one of which is indicated at 23. Seat 23 is positioned behind a dashboard 26. A steering control system 30 is arranged between seat 23 and dashboard 26. Seat 23 includes a seatback 36 supporting a headrest 38.

Figure 3:
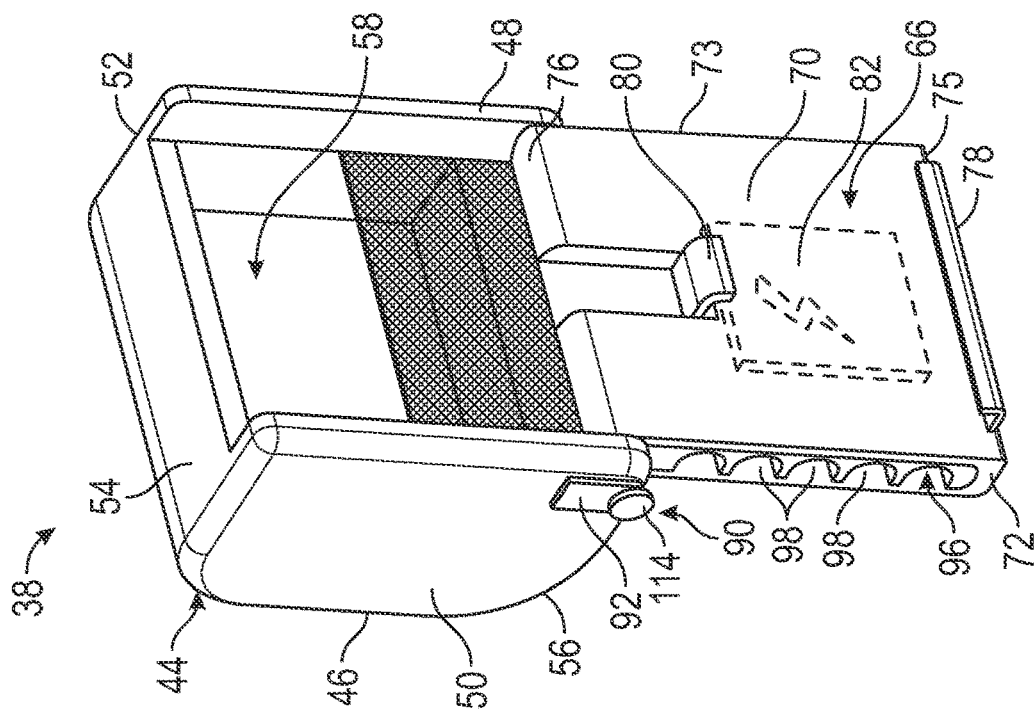
FIG. 3 is a left rear perspective view of the vehicle headrest with the cover in an open position, in accordance with a non-limiting example.
Figure 2:
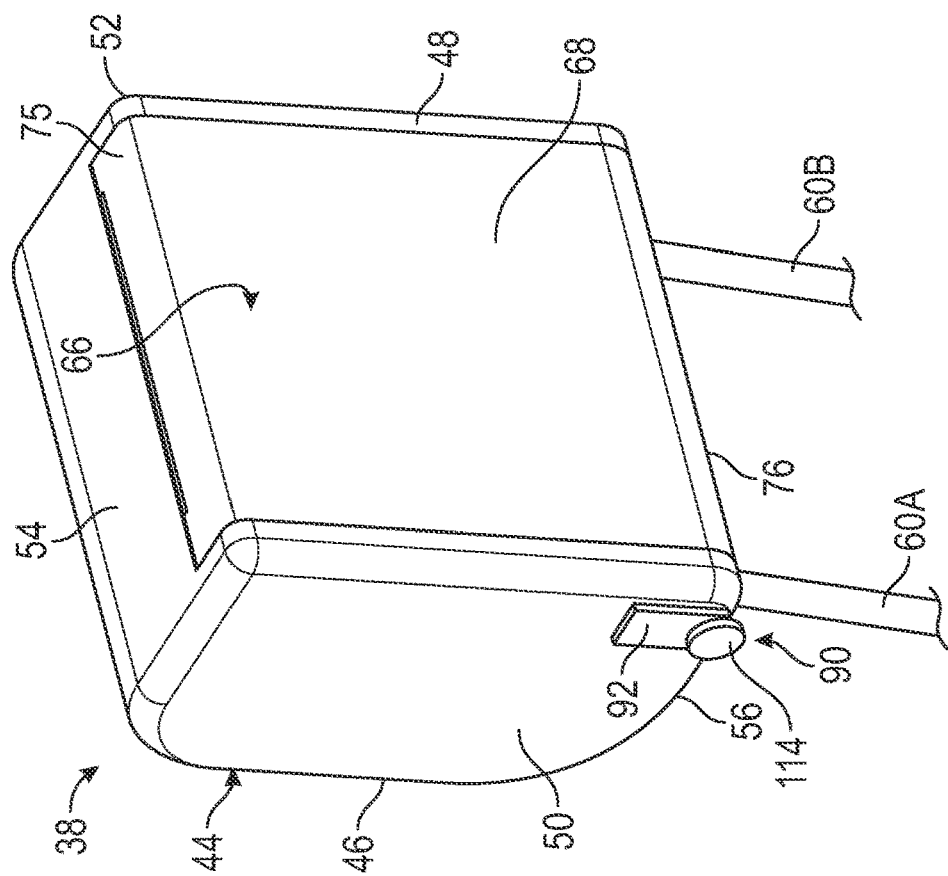
FIG. 2 is a left rear perspective view of a vehicle headrest including the storage zone and cover, in accordance with a non-limiting example.
Figure 4:
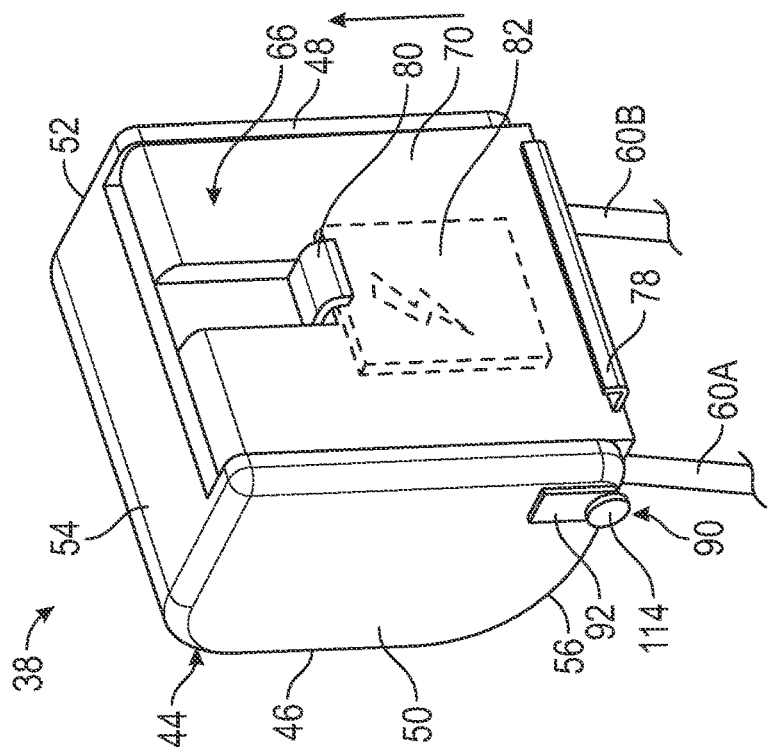
FIG. 4 is a left rear perspective view of the vehicle headrest with the cover in an open position and adjusted position, in accordance with a non-limiting example.

With reference to FIGS. 2, 3, and 4, headrest 38 includes a body 44 including a first or forwardly facing surface 46, a second, or rearwardly facing surface 48, a first side surface 50, a second side surface 52, a top surface 54 and a bottom surface 56. Body 44 includes an internal storage volume 58 (FIG. 3) that may include a variety of article supports (e.g., nets, hooks, shelves, and the like). Headrest 38 includes a pair of support members 60A and 60B that extend into seatback 36. In a non-limiting example, a cover 66 is connected to headrest 38. Cover 66 may selectively cover internal storage volume 58. In a non-limiting example, a user may store various articles such as wallets, spare keys, and the like in internal storage volume 58. In a non-limiting example, internal storage volume 58 may take up about 20% of an overall internal space (not separately labeled) of headrest 38. When opened, cover 66 may pivot relative to rearwardly facing surface 48 of headrest 38 and/or translate relative to headrest 38 as shown in FIGS. 3 and 4.

In accordance with a non-limiting example, cover 66 includes a first surface portion 68, a second surface portion 70 opposite to first surface portion 68, a first edge 72, a second edge 73 that is opposite first edge 72, a first end portion 75, and a second end portion 76. When closed, first surface portion 68 is substantially flush with rearwardly facing surface 48 of headrest 38. First edge 72 and second edge 73 extend between first end portion 75 and second end portion 76. Depending on user preferences, either first surface portion 68 or second surface portion 70 may be rearwardly facing as will be detailed more fully herein. An electronic device support 78 is provided on second surface portion 70. A holder 80 is also provided on second surface portion 70. Holder 80 may be adjusted to secure an electronic device (not shown) on second surface portion 70. In addition, an electronic device charger 82 may be provided on second surface portion 70 to provide power to an electronic device resting on electronic device support 78. In a non-limiting example, electronic device charger 82 may be a wireless charger that is connected to a vehicle electric system.

Figure 5:
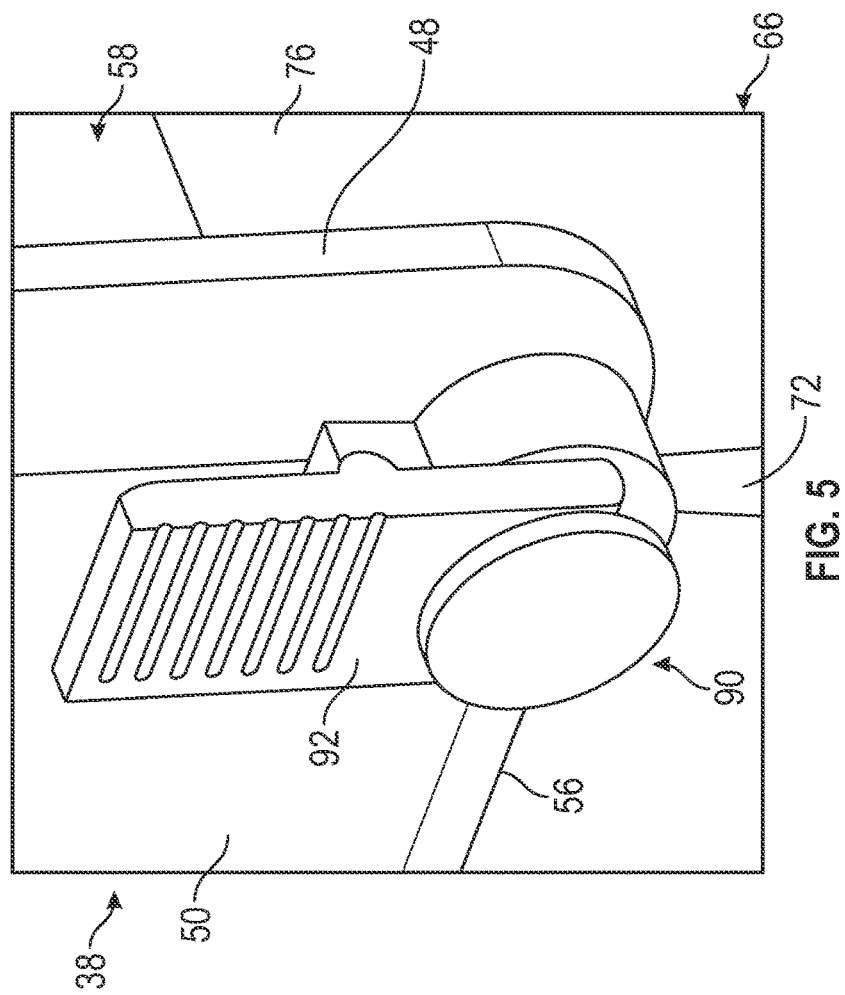
FIG. 5 is a detail view of a selectively retractable hinge of the cover of FIG. 1, in accordance with a non-limiting example.

In accordance with a non-limiting example, cover 66 is coupled to body 44 through a selectively retractable hinge 90 coupled to an actuator 92 as shown in FIG. 5. Actuator 92 may be accessed to withdraw selectively retractable hinge 90 allowing cover 66 to translate along body 44. While shown as being arranged on first side surface 50, selectively retractable hinge 90 may be arranged on second side surface 52 or on both first side surface 50 and second side surface 52. Reference will now follow to FIGS. 6A-6E in describing selectively retractable hinge 90 in accordance with a non-limiting example.

Figure 6A:
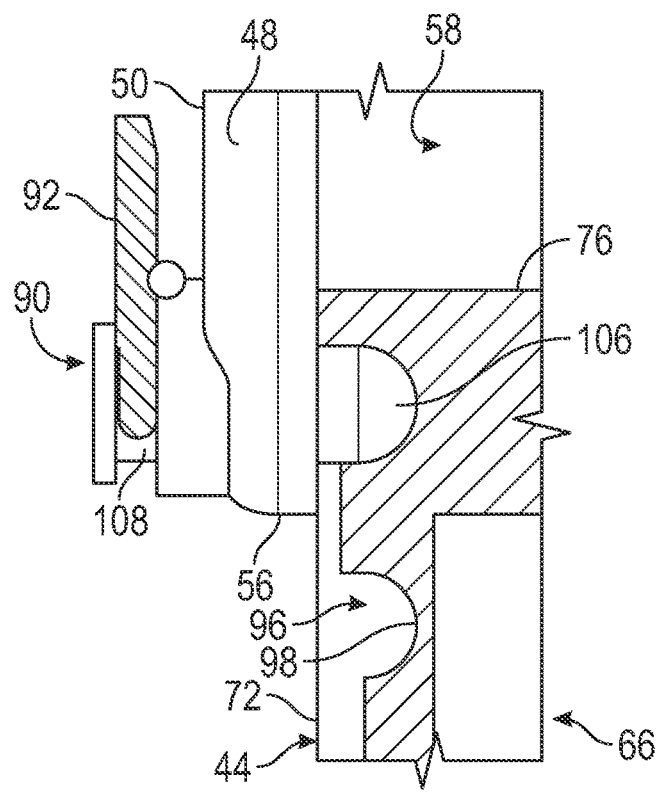
FIG. 6A is a plan view of the selectively retractable hinge with the cover in a closed position, in accordance with a non-limiting example.

As shown in FIG. 6A, cover 66 includes a groove 96 that extends along first edge 72. A plurality of detents or hinge receiving recesses, one of which is indicated at 98 extend from groove 96 into cover 66. Hinge receiving recesses 98 includes a generally circular profile and establish a plurality of translational adjustment positions for cover 66. That is, cover 66 may be placed between a first or lower translational adjustment position such as shown in FIG. 3 and a second or upper translational adjustment position such as shown in FIG. 4 where cover 66 extends over internal storage volume 58. The number of translational adjustment positions would corelate to the number of detents 98. As cover translates along groove 96, depending upon orientation, first surface 68 or second surface 70 may remain generally coplanar with rearwardly facing surface 48 of headrest 38

Figure 6B:
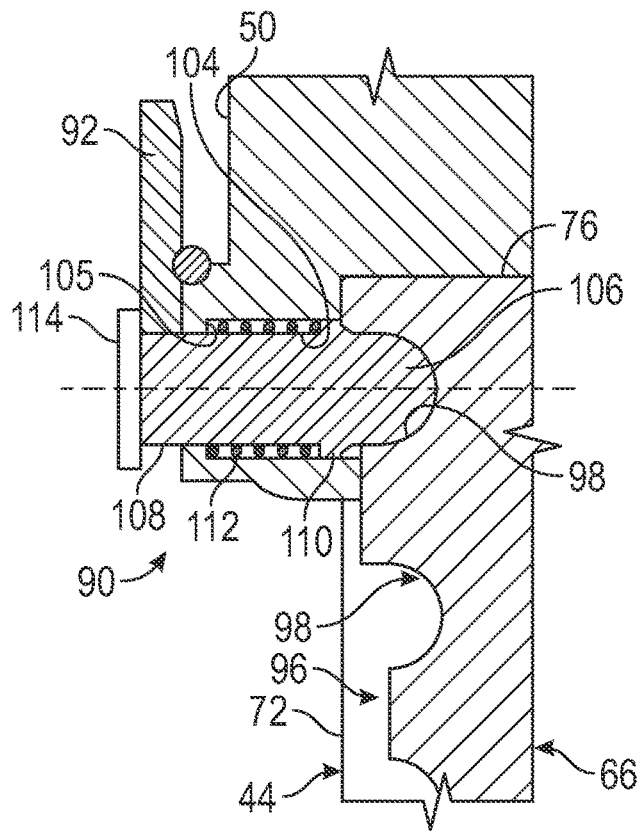
FIG. 6B is a plan view of the selectively retractable hinge with the cover in an open position, in accordance with a non-limiting example.

In a non-limiting example, shown in FIG. 6B, body 44 includes a passage 104 extending through first side surface 50 near bottom surface 56. Passage 104 includes an end wall 105. Selectively retractable hinge 90 is arranged in passage 104 and includes a first end 106, a second end 108 and a shoulder 110 that is arranged between first end 106 and second end 108. A biasing element 112 that may take the form of a spring (not separately labeled) is disposed about selectively retractable hinge 90 between end wall 105 and shoulder 110. Biasing element 112 urges selectively retractable hinge 90 toward hinge receiving recess 98. Selectively retractable hinge 90 is also shown to include a head 114 arranged at second end 108. Head 114 is engaged by actuator 92 to shift selectively retractable hinge 90 within passage 104.

Cover 66 may be pivoted open about selectively retractable hinge 90 as shown in FIG. 6B. At this point, actuator 92 may be activated to withdraw selectively retractable hinge 90 from one of the plurality of hinge receiving recesses 98 as shown in FIG. 6C. Cover 66 may then translate or shift along second surface 48 upwardly as shown in FIG. 6D to a desired position. When in the desired portion, actuator 92 may be released such that biasing element 112 urges selectively retractable hinge 90 into another one of the plurality of hinge receiving recess 98 holding cover in the desired position as shown in FIG. 6E.

Figure 7:
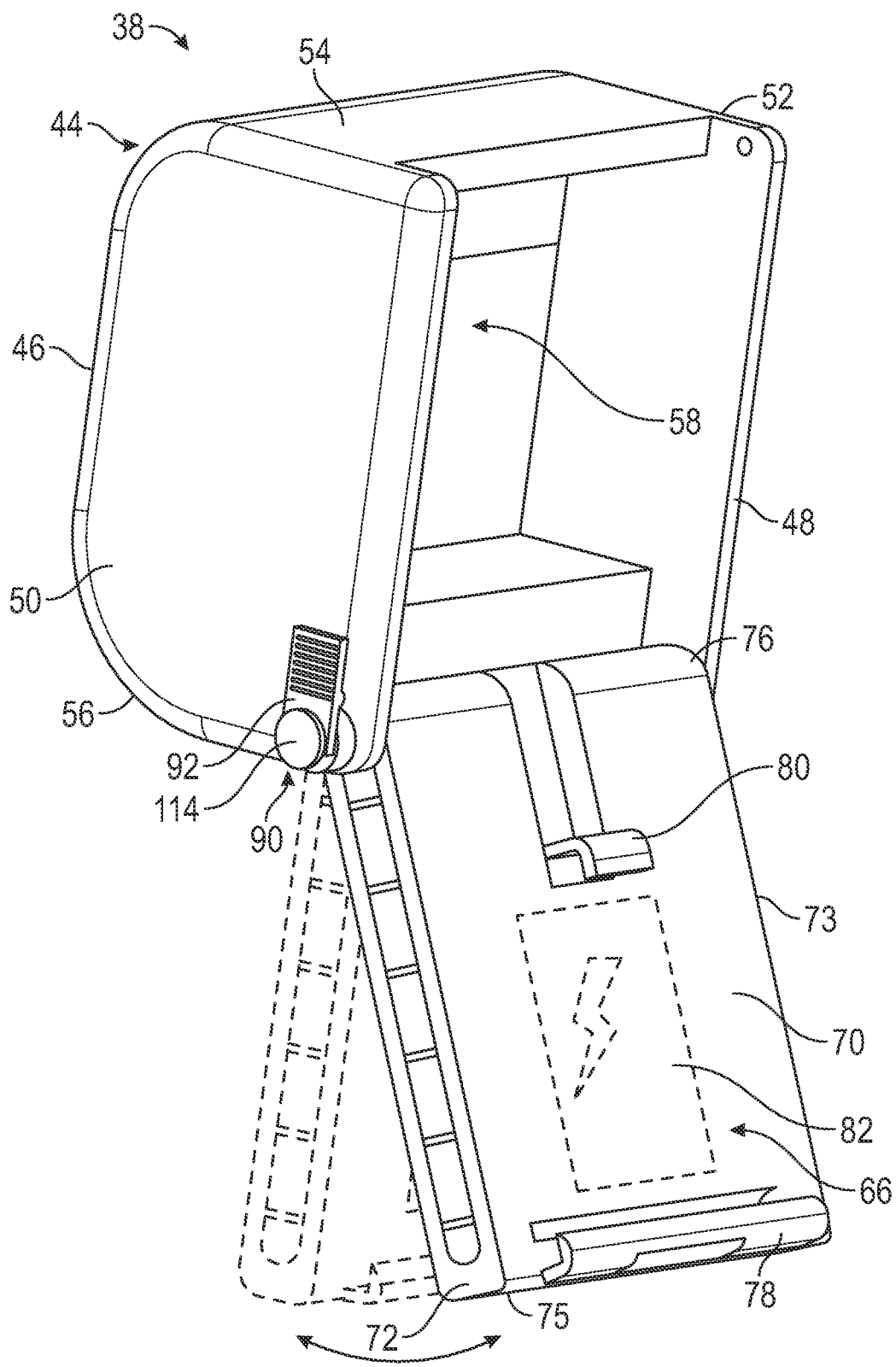
FIG. 7 is a lower left perspective view of the cover pivoting on the selectively retractable hinge, in accordance with a non-limiting example.
Figure 9:
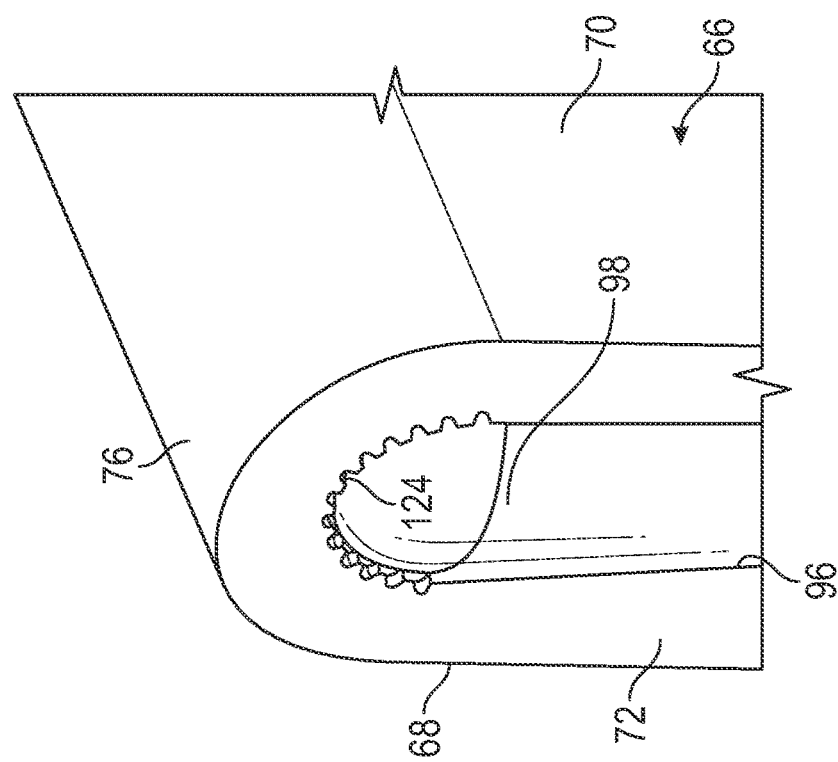
FIG. 9 is a detail view of a hinge receiving recess formed in the cover, in accordance with a non-limiting example.
Figure 8:
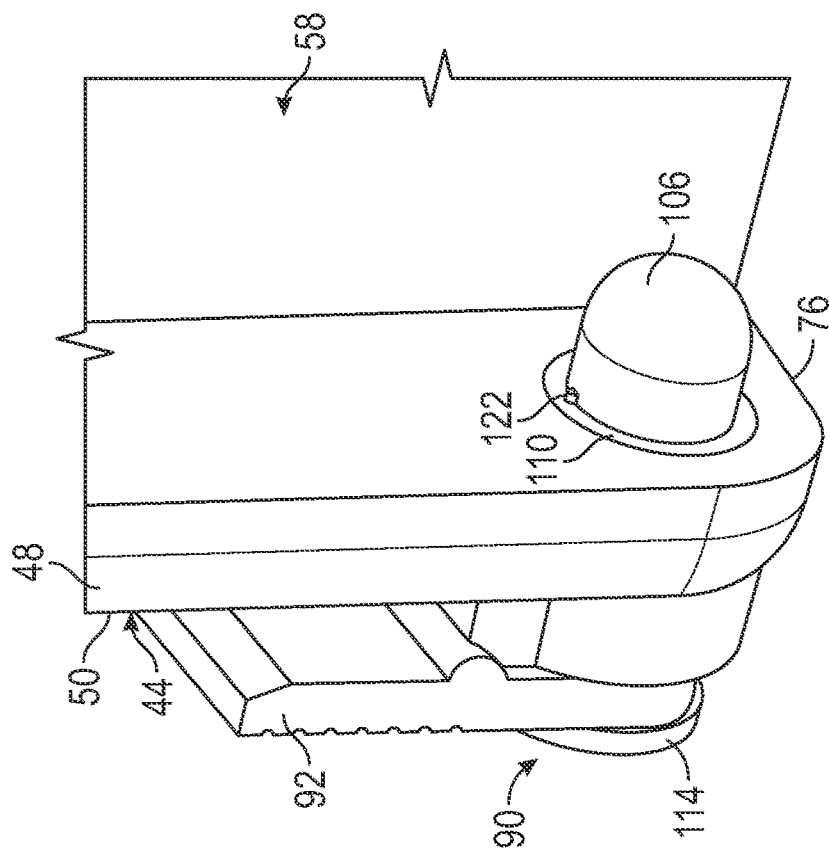
FIG. 8 is a detail view of an end portion of the selectively retractable hinge, in accordance with a non-limiting example.

In addition to being selectively translatable, cover 66 may be rotated and fixed in a plurality of angular positions as shown in FIG. 7. In a non-limiting example, shown in FIG. 8, selectively retractable hinge 90 includes a detent element 122 extending from shoulder 110 towards first end 106. FIG. 9 illustrates a plurality of grooves 124 that surround, in part, the one of the plurality of hinge receiving recess 98 close to, for example, first end portion 75. With this arrangement, selectively retractable hinge 90 may be withdrawn into passage 104 and cover 66 placed at a selected angle. Once at the selected angle, selectively retractable hinge 90 is re-inserted with detent element 122 passing into one of the plurality of grooves 124. At this point, cover 66 will remain at the selected angle until selectively retractable hinge 90 is again withdrawn into passage 104.

Figure 12:
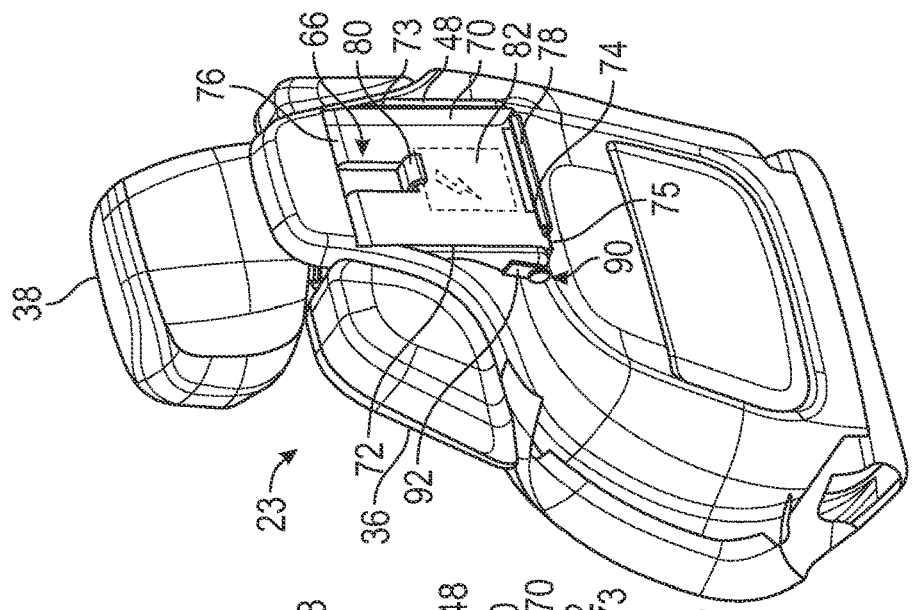
FIG. 12 depicts the cover of FIG. 10 at a second electronic device support configuration, in accordance with a non-limiting example.
Figure 11:
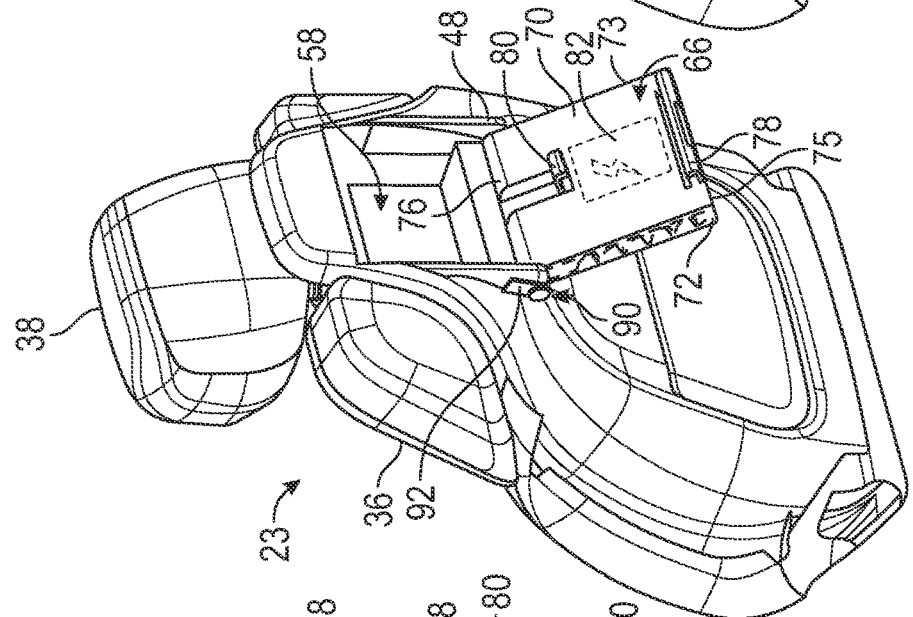
FIG. 11 depicts the cover of FIG. 10 at a first electronic device support configuration, in accordance with a non-limiting example.
Figure 10:
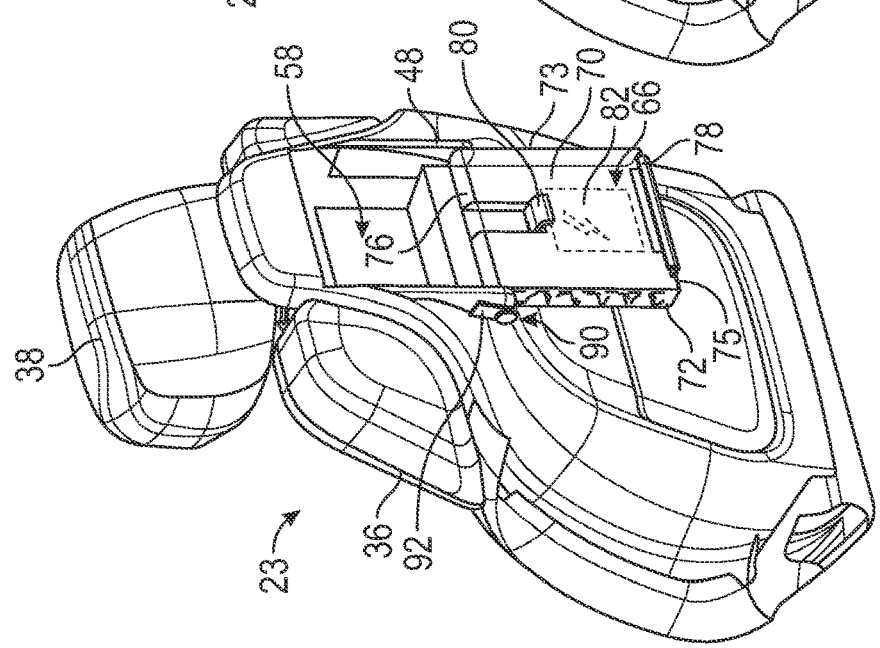
FIG. 10 depicts the storage zone and cover provided in a seatback of the vehicle seat, in accordance with a non-limiting example.

At this point, it should be understood that while shown as being integrated into headrest 38, internal storage volume 58 and cover 66 may be integrated into bodies of other vehicle components. As shown in FIGS. 10, 11, and 12 internal storage volume 58 and cover 66 may be integrated into seatback 36. Cover 66 may rotate open as shown in FIG. 10 ready to support a device on electronic device support 78. Cover 66 may be temporarily affixed at a particular angle as shown in FIG. 11 or translated/slid upwardly as shown in FIG. 12 to establish a desired viewing angle and/or height to promote a more comfortable interaction with the electronic device supported thereon.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical, and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A seat component for a vehicle seat comprising:
    a body having a first surface, a second surface opposite the first surface, a first side surface, a second side surface, a top surface, and a bottom surface, and an internal storage volume extending from the second surface toward the first surface within the body; and
    a cover pivotably mounted to the body at the internal storage volume, the cover including a first surface portion and a second surface portion, the second surface portion including an electronic device support,
    wherein the body includes a selectively retractable hinge mounted to one of the first side surface and the second side surface, the selectively retractable hinge being engageable with the cover.

2. The seat component according to claim 1, wherein the cover includes a first edge and a second edge, the selectively retractable hinge engaging one of the first edge and the second edge to support the cover.

3. The seat component according to claim 2, wherein the one of the first edge and the second edge includes a hinge receiving recess, the hinge receiving recess being selectively engageable by the selectively retractable hinge to form a sliding interface between the cover and the body.

4. The seat component according to claim 3, wherein the one of the first edge and the second edge includes a groove, the hinge receiving recess extending into the cover from the groove.

5. The seat component according to claim 4, wherein the hinge receiving recess includes a generally circular profile partially surrounded by a plurality of grooves.

6. The seat component according to claim 5, wherein the selectively retractable hinge includes a detent element arranged to engage with one of the plurality of grooves to establish an angular position of the cover relative to the seat component.

7. The seat component according to claim 1, wherein one of the first surface portion and the second surface portion includes an electronic device charger.

8. The seat component according to claim 1, wherein the body defines a headrest.

9. The seat component according to claim 1, wherein the body defines a seatback.

10. A vehicle comprising:
    a vehicle body including a passenger compartment;
    a seat mounted in the passenger compartment; and a seat component defining a portion of the seat, the seat component comprising:
a body having a first surface, a second surface opposite the first surface, a first side surface, a second side surface, a top surface, and a bottom surface, and an internal storage volume extending from the second surface toward the first surface within the body; and
a cover pivotably mounted to the body at the internal storage volume, the cover including a first surface portion and a second surface portion, the second surface portion including an electronic device support,
wherein the body includes a selectively retractable hinge mounted to one of the first side surface and the second side surface, the selectively retractable hinge being engageable with the cover.

11. The vehicle according to claim 10, wherein the cover includes a first edge and a second edge, the selectively retractable hinge engaging one of the first edge and the second edge to support the cover.

12. The vehicle according to claim 11, wherein the one of the first edge and the second edge includes a hinge receiving recess, the hinge receiving recess being selectively engageable by the selectively retractable hinge to form a sliding interface between the cover and the body.

13. The vehicle according to claim 12, wherein the one of the first edge and the second edge includes a groove, the hinge receiving recess extending into the cover from the groove.

14. The vehicle according to claim 13, wherein the hinge receiving recess includes a generally circular profile partially surrounded by a plurality of grooves.

15. The vehicle according to claim 14, wherein the selectively retractable hinge includes a detent element arranged to engage with one of the plurality of grooves to establish an angular position of the cover relative to the seat component.

16. The vehicle according to claim 10, wherein one of the first side surface and the second side surface includes an electronic device charger.

17. The vehicle according to claim 10, wherein the body defines a headrest.

18. The vehicle according to claim 10, wherein the body defines a seatback.

19. The seat component according to claim 1, wherein the cover has a first configuration in which the cover covers the internal storage volume with the first surface portion facing away from the body, and a second configuration in which the cover covers the internal storage volume with the second surface portion facing away form the body.

20. The vehicle according to claim 10, wherein the cover has a first configuration in which the cover covers the internal storage volume with the first surface portion facing away from the body, and a second configuration in which the cover covers the internal storage volume with the second surface portion facing away form the body.

* * * * *